Aug. 8, 1939.  A. MUSHER  2,168,360
CONCENTRATED FOOD PRODUCT

Filed Nov. 17, 1937

Inventor
Albert Musher

By Sol Shappirio
Attorney

Patented Aug. 8, 1939

2,168,360

UNITED STATES PATENT OFFICE 2,168,360

CONCENTRATED FOOD PRODUCT

Albert Musher, New York, N. Y., assignor to Musher Corporation, Elizabeth, N. J., a corporation of New Jersey Application November 17, 1937, Serial No. 175,097

10 Claims. (Cl. 99—1)

This invention relates to food compositions, and particularly to compositions for edible purposes in which the solid components of food type materials are associated together into a unitary entity; as well as to methods of making such compositions and fabricated products containing such compositions.

Many food compositions are of materials that contain substantial quantities of water, either in the form of solutions or more usually dispersions and emulsions. The presence of such moisture or water or analogous liquid components has many undesirable features from the standpoint of shipment of such products, as well as for the reason that such products lend themselves to deterioration and insect or bacterial attacks.

The elimination of moisture or water, or other liquid vehicle of that character is not generally possible in these products without seriously affecting their manufacture or subsequent utility, and consequently such types of food products have generally been manufactured in the form of their aqueous emulsions, or dispersions, or solutions.

Among the objects of the present invention is the production of food materials in what may be described as concentrated form, substantially free from aqueous components, but in condition for ready and immediate and inexpensive conversion into emulsions or similar type materials.

Further objects include the production of such edible compositions in which all of the components of the final desired food material insofar as such components are solid, or substantially solid, or semi-solid ingredients, are present in the concentrated food material produced in accordance with the present invention, so that such base material may be readily converted into the final desired product, as by mere addition of water, etc., with any desired or necessary cooking operation.

Still further objects and advantages of the present invention will appear from the more detailed description set forth below, it being understood, however, that this more detailed description is given by way of illustration and explanation only and not by way of limitation, since various changes therein may be made by those skilled in the art without departing from the scope and spirit of the present invention.

Figure 1:
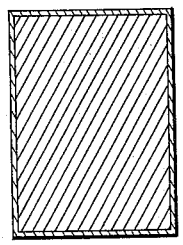
Figure 2:
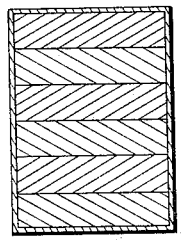

In connection with that more detailed description there is shown in the accompanying drawing in Figure 1, a transverse section through a product of the present invention encased in a wrapper; and in Figure 2, a modified packaged product produced in accordance with the present invention.

More particularly the present invention is concerned with the preparation of food materials, particularly concentrated food materials of a character that can be used to produce food materials that require substantial portions of moisture or water, or other liquids in their final make-up; compositions produced in accordance with the present invention may be made in such form that the aqueous or similar liquid materials are eliminated from the composition without sacrifice of any desirable properties therein, and while giving to such base composition important characteristics, leaving to the ultimate consumer the addition of water or similar aqueous materials, which are taken up by the concentrated base materials of the present invention with greater avidity, so that they are readily converted into the product in form for consumption. Usual cooking operations of the usual household type may be necessary or desirable in the conversion of the concentrated base material into the product for food consumption, but such operations are readily carried out without difficulty in connection with materials of the present invention.

Primarily the invention is concerned with the utilization of a fat or oil material of substantially hard character at ordinary room temperatures, which fat or oil material is utilized as a carrier vehicle for the other solid or semi-solid, or pasty components necessary in the food material. While some small content of water, or moisture may be present in such compositions because of the moisture content of ingredients like salt used in the manufacture of these base materials, one of the fundamental purposes of the invention is the preparation of the base product with no added water or moisture, and as free from water or moisture as is commercially possible.

The fat or oil employed in this connection and used as a carrier for the other ingredients present may be of any desired type, animal, vegetable or mineral, semi-solid, or solid, or a mixture of oils and fats having the desired rigidity. The nature of such composition may vary to some extent with the season of the year and also with the climate in which the products are designed to be used, but generally a substantially hard fat considered from the standpoint of the condition under which it is to be employed is utilized as the carrier material. For example, a fat or oil, or mixed fat and oil composition having a melting point of from 70–120° F. covers the preferred range of materials employed in accordance with the present invention.

While the fat, oil or wax type of vehicle, solid or semi-solid, animal, vegetable or mineral may be employed as set forth above, it is more desirable to utilize with such fat component, a material which enables the fat to be carried into more ready dispersion or emulsion form when, for example, it is to be beaten or heated with water or aqueous materials. A variety of water absorbent materials or bodying ingredients may be utilized for this purpose, which substances may be generally said to have the property of forming thick pasty compositions with water or aqueous materials, and among such water absorbent substances that may thus be desirably incorporated with the fat are such materials as corn starch, tapioca and similar products, gums like gum arabic, agar agar, gelatin and pectin materials, etc. These materials of water absorbent character are incorporated with the hard fat into an intimate admixture with or without added spices, condiments, etc., depending on the nature of the product which it is ultimately desired to produce. The presence of the water-absorbent bodier with the oil or fat, or wax material intimately associated therewith enables the product to be readily converted into a smooth emulsion or dispersion type by mere admixture with water, or generally by simple cooking operations within the sphere of the ordinary housewife.

As pointed out, a principal feature of the present invention is the utilization of the oil or fat as a carrier for all of the solid or semi-solid ingredients desired in a particular type of food product, so that such concentrated base material may by a mere addition of water or vinegar, or similar aqueous materials, be converted to the final desired product. However, the fat or oil vehicle with the water-absorbent component may be used as an entity to be manufactured and sold as such, because such product utilized with condiments or other added components and water, or aqueous liquid, will enable the spices or similar additions to be readily incorporated into the aqueous emulsion form due to the presence of the starch or other water-absorbent bodier in the oil or fat material. Such oil and fat combinations with the water-absorbent bodier, therefore, offer particular advantages as a food component, or component for production of food materials, but as noted the presence of added components so that the material by simple operations is converted into final condition for consumption represents a more important phase of this invention.

While the invention lends itself to the production of a wide variety of different types of materials, such as ice creams, or ice cream mixes, puddings, salad dressings, cream soups, cooked cereals, etc., as well as many other food products in solid or semi-solid form, and including also cosmetic and pharmaceutical products based on similar principles, nevertheless for most purposes, the proportions of ingredients present particularly from the standpoint of oil or fat components, and of water-absorbent bodier, should be restricted in order to produce materials of most desirable characteristics. Thus generally in the base materials produced in accordance with the present invention, the fat content or oil and fat mixture will not be less than 25%, and should generally be substantially greater than this depending, of course, on the nature of the product to be produced; salad dressings or salad dressing bases having much higher percentages, such as 50 to 66⅔%, for example. The water-absorbent material, such as corn starch, on the contrary, should be a minor constituent and in no event will amount to more than 50% of the composition, except under very unusual circumstances, more generally such component running between 15 and 30%. Where water-absorbent materials of the nature of corn starch are employed in compositions containing emulsifying gums also, the amount of the starch type water-absorbent bodier may be materially reduced by utilizing small quantities of the emulsifying gums.

The consistency, or solidity, or liquidity of the combinations can be governed by the type of fat, wax or oil, or combinations thereof used in producing the product, while the type of water-absorbent material, whether of emulsifier, thickener, or stabilizer characteristics materially affects the ease with which the product may be emulsified with water and converted into desired edible form.

As exemplary of the production of compositions in accordance with the present invention, the following procedure for the preparation of a base material is given. A salad dressing base formula may be constituted as follows, the parts being by weight:

| | |
|---|---:|
| Cornstarch | 30 |
| Salt | 10 |
| Sugar | 10 |
| Paprika | 10 |
| Hydrogenated fat | 50 |

The ingredients may be intimately admixed together, either with or without a cooking operation or heat treatment. Dry materials may be sifted together and mixed with the solid or semi-solid fat. Fats may be unheated where soft enough to mix, particularly if there is a sufficient amount used to form the product into a brick type material. More desirably, however, the fat is melted in order to obtain more intimate combination with the dry ingredients, and the molten fat or liquid oil type material with the dry ingredients are stirred until the fat begins to congeal, so that thorough dispersion of the dry ingredients is obtained.

Any desired means of incorporating the components together may be utilized. Where fat and oil combinations are employed the ingredients may be heated together to combine the oil and fat together, followed by addition of the other solid ingredients, quick chilling over chill rolls, or by other means, permitting the various ingredients to stay in the fat for longer or shorter periods, thereby influencing fat absorption, etc. If the product is permitted to cool in mass form, it will be in substantially solid condition, and can be shaped or molded, or printed. On the other hand, if constant stirring or agitation is used until it is in substantially cool condition, the product may be broken up into divided small masses. Of course, the larger blocks of material may also be broken up in the same way.

The base material of the character given above may be readily converted into desired products by cooking the same with a prescribed amount of water until desired consistency is reached, or if desired until it has thickened materially. The material made in this way may also be beaten or whipped in order to beat air into it to make it lighter, or aeration may be carried out in any other way. Additional water-containing flavors or ingredients, such as vinegar, may be added, particularly in the making of salad dressing materials. Where the base is made up with ingredients that do not require any cooking, and if the base product is soft enough to enable thorough beating or mixing with the added water, the concentrated food base may be merely placed in a container, water or water-containing materials added thereto, food base and water or aqueous materials intimately mixed and treated further as desired by the consumer.

Considering the particular formulation given above for the salad dressing base, this may be converted into a salad dressing as follows: one measuring cup of water is added to a preweighed brick of the salad dressing base of the above formula having a weight of 100 grams. These are cooked together with constant stirring for about one minute after it begins to boil. There may then be added four tablespoons of vinegar and one whole egg, and the entire material beaten with a rotary beater of the usual household type. A finished salad dressing is thus readily produced.

While corn starch has been given above in the production of this salad dressing base, the various other water-absorbent materials may be used in lieu thereof, or in admixture therewith, or various combinations may be employed depending on the nature of the products to be produced. Thus in lieu of the corn starch, other emulsifying gums, such as gum arabic, gum tragacanth, karaya, etc. may be used. Particular combination of ingredients is dependent on the nature of product being produced, and even some variation can be carried out since, for example, in the production of cream-type soups, one may use the corn starch type water-absorbent agent, or the same types of components may be utilized without the corn starch type of water-absorbent material, but utilizing the gum type in lieu thereof.

The nature of the compositions produced in accordance with the present invention enable novel packaging to be carried out. If the concentrated food or base material is of substantially solid character it may be printed in the usual way for butter and similar dairy products, and wrapped or packaged in paper cartons, etc. Such solid compositions may also be packaged directly in situ in the cartons or liners by utilizing the material in plastic condition or in its molten form. If the products are more fluid in character, they may be deposited in containers of can, glass, or other type.

Where the materials are substantially solid in character, a variety of different products may be packaged in a single container. Thus a half dozen different ice cream mix flavors, or a half dozen different soup base materials may, for example, be packaged in a single carton, and thus without requiring a half dozen packages of different materials, a single carton of these base materials may be utilized for the concentrated base materials of different flavors, etc.

The products of this invention have many advantages, among which may be noted the following: In the first place, it may be noted that since no substantial amount of the moisture is present except what may be normally present in components utilized in producing the composition, there is less tendency for the product to deteriorate as a result of development of rancidity, off-flavors, off-odors, and other forms of deterioration. At the same time there is less likelihood of weevil and insect infestation, caking, etc. that normally occur in powdered dry materials.

Substantial absence of water in the product reduces the weight of the base product for shipment purposes, so that there is material saving in transporation costs, and at the same time since water is frequently the largest single component of the emulsion type food products, absence of water in accordance with the present invention materially reduces the size of container required for a comparable amount of food material.

The nature of these products enables them to be readily packaged in paper, cardboard, parchment, or other analogous packaging materials, making the use of glass containers, such as jars or bottles, or in metal containers, such as cans, unnecessary. Such packaging as indicated above can be of printed products, or can be carried out by packaging the material while in fluid or plastic condition in situ in the package. A variety of different types of products in block or solid form may be packaged in a single container. For example, for household use, a number of food colors can be carried in the base material, and a variety of surh colors in individual color blocks packaged in a single container. Similarly chopped nuts and chopped fruits can be carried in the base material, and different kinds of nuts or fruits, or any desired selection of other types, or both, may be packaged in a single container to be utilized as desired. This is true where such products are supplied not only for household use, but also for bakers or other operators utilizing such materials in large scale operation. Nor is it essential that a package of variated products need be all of the same class. For household use, a variety of different types of materials may be present. Thus a powdered gelatin introduced into the base material, pectin combinations, etc. may all be employed, and thus makes available from a single package different types of products utilizable, however, for more or less unified purposes in the home or in manufacturing operations.

It should be kept in mind that while the hard fat material may be utilized as a carrier, more desirably for many of these combinations the oil or fat incorporated with the water-absorbent material is the preferable vehicle for many of these purposes. This form of product enables a block of pre-weighed or pre-measured quantity to be utilized or only a portion of the block to be employed, without danger of spoilage of the residue, eliminating the necessity for weighing or measuring of ingredients so troublesome to the housekeeper.

Where components of edible type require a cooking operation, their incorporation into the base material of the present invention coupled with the heat treatment in the presence of the oil or fat seems to affect the nature of those products, and to give them a pre-cooking or pre-digestion of materially desirable effect on the nature of the resultant products. This may be due in part to the fact that the oil or fat components affect the fibers of the powdered ingredients, so that during subsequent cooking operations in which the powdered material thickens, swells, or is acted on by the aqueous material, a softer or more tender result is secured. These considerations apply not only to mixtures of various powdered materials, but to single ingredients or dehydrated products, such as dehydrated fruits, for example, apples. The distribution of the solid components in the base material enables ready dispersion of those materials into the final product to be obtained with more rapid and easier emulsification, thickening, solubility, etc. Due to the fact that such solid ingredients are present in the oil or fat base material, there is no tendency for segregation of dry or powdered materials, or of lack of uniformity in a product when taken from the package, nor is there any sifting of dry particles out of the package. Lack of segregation is particularly important for those cases where a variety of dry powdered materials for flavoring and other purposes are utilized as an entity. For example, in making a base for apple pie filling, the dry components include dehydrated apples, sugar, cinnamon, and other ingredients. If packaged as such, segregation of the ingredients in the package would take place when the consumer attempted to use a portion of the packaged product. Fixed in the base material uniformity of the product is assured whether a small or any portion of the packaged material is utilized.

The invention is not limited to the making of products which normally contain substantial quantities of oils or fats in the finished edible material, although the products of the present invention are particularly useful in such connection. And this is particularly true in avoiding the necessity for the use of liquid oils, as, for example, in the production of salad dressings, where cottonseed oil, olive oil, etc. are generally employed. Such liquid oils in substantially fluid dressings require glass packaging, whereas the base material of the present invention utilizing a substantially solid or semi-solid carrier for the condiments, flavoring materials, etc. eliminates the necessity for glass packaging. And further, there is no separation of oil from the dry materials or product produced in accordance with the present invention, so that a more agreeably appearing product is produced. And finally it may be noted that due to the dissemination of the fat or oil in the products of the present invention uniformly throughout the mass, incorporation of the fat into the dressing components is more readily secured.

Where the food base is heated with water, as in the preparation of a salad dressing, from, for example, a base material composed of hardened fat, dry spices and corn starch, in the proportions as set forth above, the hardened fat melts, and it takes on the liquidity of liquid oil, permitting the corn starch or similar material to come into rapid intimate contact with the water, and producing rapid and efficient thickening. With stirring, the oil is disseminated in the liquid state throughout the thickened mass. As the product cools, it ultimately congeals to a thickened mass with the fat distributed uniformly throughout the product, and enabling relatively hard fats to be employed in the production of salad dressings which could heretofore be produced effectively only with liquid oils.

It will be seen that the present invention can be utilized in the production of a wide variety of food base compositions in concentrated form, particularly where all of the solid or semi-solid ingredients of the final food composition are present in the base material, so that only the addition of water or similar liquids is necessary in producing the final food product. For many types of products an oil or fat base of the character set forth above may serve as the vehicle for the solid food components. Thus the oil or fat vehicle can be utilized in the production of food base compositions of concentrated character with sugars, chopped nuts, dehydrated foods, such as fruits, vegetables, milk, eggs and lemon juice; alimentary paste materials, such as macaroni, spaghetti and noodles, food colors of various types, liquid coloring oils, essential oils, rice, concentrated soups, pie filling mixes, ice cream mixes, etc. In the production of cream soup base materials, the water-absorbent bodiers of the corn starch type and similar materials may also desirably be present, and as a matter of fact, any of the materials given above carried in the fat vehicle may also be employed, and carried in the fat-water-absorbent bodier. Alimentary pastes may, for example, be made up with or without cheese additions, and with or without dehydrated milk, and with or without salt into a base composition desirably employed for food purposes.

As illustrating other characters of products produced with the substantially solid oil and water-absorbent bodier, the following chocolate sauce type of material may be noted:

| | Parts |
|---|---|
| Unsweetened chocolate (melted) | 54 |
| Sugar | 54 |
| Cornstarch | 10 |
| Hydrogenated oil (110° melting point) | 30 |

These materials may be incorporated and worked together in any desirable manner by procedures analogous, for example, to those set forth above.

The type of product produced from any of the compositions set forth above may be varied as to its physical form within substantial limits. Thus after the fat and bodier and added food ingredients have been mixed together, the product may be pressed to form a brick, or it may be shaken until the fat is congealed, so as to result in the particles of the food base being coated with the hardened fat, while not necessarily being converted into brick form.

If desired, only a portion of the fat or other adhesive agent may be included with the dry components, sufficient desirably being employed, so that the composition may be compressed into a desired form, as for example, in the form of a brick, and such form then dipped into molten fat of substantially hard consistency, which upon congealing will form a coating about the food base product. Such brick may be coated further if desired with plastic, semi-hardened, or melted or softened fat of substantially hard consistency, or with paraffin, or with wax. Or a composition containing substantial proportions of fat as set forth above may after conversion into block form, be dipped into or coated with an additional quantity of fat for added covering and protection purposes.

While the usual method of dipping and coating such bricks or block form materials may be employed, other methods may be utilized, particularly where it is necessary to dip or coat a brick containing a fat of one melting point, into a fat of higher melting point. It may be noted that in general, the fats may be considered from two standpoints that affect their congelation point, one such consideration being based on temperature and the other on the "setting" quality of the fat. For example, a particular fat, of say 110° melting point, will melt upon being heated above its melting point, but upon cooling may remain liquid at temperatures substantially below such melting point, as for example at temperatures of 90 or 95°, or in some cases even lower. On standing, however, such fat will usually congeal to its original body. These characteristics may desirably be utilized for the dipping or coating operation by melting the fat into which the brick is to be dipped or coated, and then cooling either rapidly or slowly until the temperature has been reduced as low as possible, so that it is still liquid, soft, or plastic, depending upon the characteristics required. The brick or block, or pieces of the product to be dipped are then dipped into or coated with this fat. The advantage of this method is that when dipping a brick, etc., containing fat into another fat, etc., there is produced a smooth and convenient covering with materially less tendency for the liquid, molten, or heated fat to melt or liquefy the fat or other similar materials that are in or that cover the product that is dipped or coated. Any desired combination of oils or fats may be utilized for these purposes. Or if desired, the block or piece to be dipped may first be chilled to any desired temperature before dipping into the fats to be utilized for coating purposes. In this way, the rate of congelation may be controlled.

Substantial uniformity of products is produced in accordance with the present invention, because of the dispersion of the various solid components throughout the oil or fat or wax vehicle, and not only is a more uniform product thus produced, but in the cooking operation, the products cook more readily and more smoothly, lumping is reduced, and the resulting product is usually superior to the same product cooked or handled in the methods available in the prior art.

The nature of the products of the present invention is such that these products cook more readily and more quickly than the individual foods do when utilized alone in the form in which they were available in the prior art; and even though more rapid cooking is available, the resulting product usually has smoother and creamier texture, and is freer from lumpiness and uncooked portions, etc. In fact, the nature of the product enables it to be cooked at a higher temperature, if desired, with reduced adhesion or sticking to the pot, etc., while bubbling or foaming is materially reduced, even though very rapid cooking is employed.

The products of the present invention may be aerated by beating, blowing air or inert gases into them, or in any other way. This aeration gives these products more of a tendency to float on the liquid, such as water, in which they are being cooked, with resulting desirable features such as, less possibility for the product sinking to the bottom of the cooking vessel and sticking, etc. As the heat melts the fat, the food ingredients fall off the bricks in relatively small pieces, and usually before they reach the bottom of the cooking container, the agitation of the boiling liquid is sufficient to keep the food products and ingredients in circulation, or the cooking operation has been carried to a point where there is little likelihood for undesirable sticking to the container, etc.

In view of the fact that products produced in accordance with the present invention may be manufactured by utilizing heated fats or oils, or combinations thereof, such heat may be employed, where the nature of the product lends itself to such features, for the purpose of sterilizing the ingredients of the compositions, bricks or blocks, or products of this invention, and for that purpose where permissible the heat may be raised, maintained or adjusted for this purpose.

Having thus set forth my invention, I claim:

1. As a substantially non-aqueous food base composition for making cooked products by cooking in the presence of water: an edible substantially hard fat and a water-absorbent bodier material in an amount not exceeding 30% of the composition.

2. As a substantially non-aqueous food base composition for making cooked products by cooking in the presence of water: an edible fat and oil component having a melting point of between 70 and 120° F., and a water-absorbent bodier material in an amount not exceeding 30% of the composition and materially less than the fat and oil component present.

3. As a substantially non-aqueous salad dressing base composition for making cooked products by cooking in the presence of water: an edible substantially hard fat, a water-absorbent bodier material in an amount not exceeding 30% of the composition, and solid salad dressing condiments, in proportions to yield a substantially solid product at normal temperatures.

4. As a substantially non-aqueous food base composition for making cooked products by cooking in the presence of water: an aerated intimate admixture of an edible substantially hard fat and a water-absorbent bodier material the latter not exceeding 30% of the composition.

5. As a substantially non-aqueous food base composition for making cooked products by cooking in the presence of water: an edible substantially hard fat, a water-absorbent bodier material in an amount not exceeding 30% of the composition, and solid primary food components, in proportions to yield a substantially solid product at normal temperatures.

6. As a substantially non-aqueous food base composition in brick form for making cooked products by cooking in the presence of water: an edible, substantially hard fat and a water-absorbent bodier material in an amount not exceeding about 30% of the composition.

7. A substantially non-aqueous salad base composition in brick form for making cooked products by cooking in the presence of water consisting of an edible, substantially hard fat, a water-absorbent bodier material, and solid salad dressing condiments, in proportions to yield a substantially solid product at normal temperatures the fat being at least 50% and the water-absorbent bodier material not more than 30% of the composition, the brick carrying on outer coating of a fat of higher melting point than that employed in the composition.

8. A food product for making cooked products by cooking in the presence of water consisting of a package containing a number of bricks of substantially non-aqueous food base compositions including an edible, substantially hard fat, a water-absorbent bodier material, and solid primary food components, the proportions of the constituents of each brick being such as to yield a substantially solid product at normal temperatures the water absorbent bodier material not exceeding 30% of the composition, the package containing at least two bricks with different primary food components.

9. As a substantially non-aqueous ice cream base composition for making cooked products by cooking in the presence of water: an edible substantially hard fat, a water-absorbent bodier material in an amount not exceeding 30% of the composition, and solid ice cream mix ingredients, in proportions to yield a substantially solid product at normal temperatures.

10. As a substantially non-aqueous cream soup base composition for making cooked products by cooking in the presence of water: an edible substantially hard fat, a water-absorbent bodier material in an amount not exceeding 30% of the composition, and solid cream soup ingredients, in proportions to yield a substantially solid product at normal temperatures.

ALBERT MUSHER.